H. W. STARK & W. KNUTS.
ROTARY CUTTER.
APPLICATION FILED NOV. 1, 1913.
1,121,776.  Patented Dec. 22, 1914.
2 SHEETS—SHEET 2.
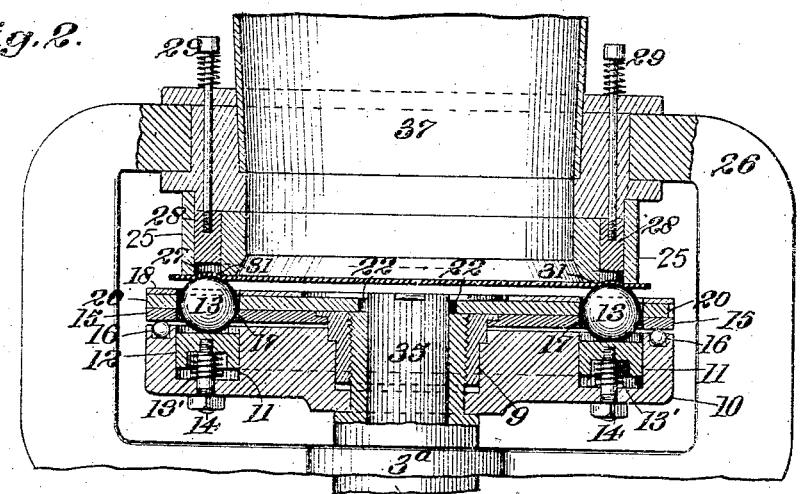
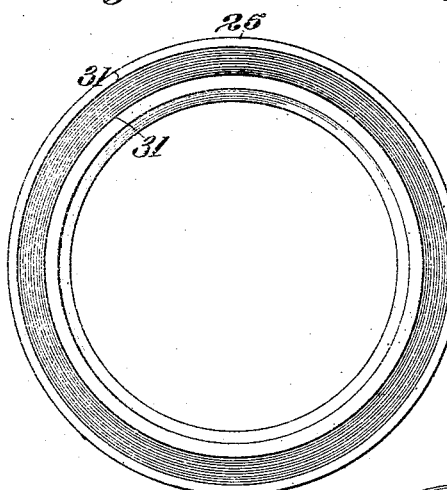
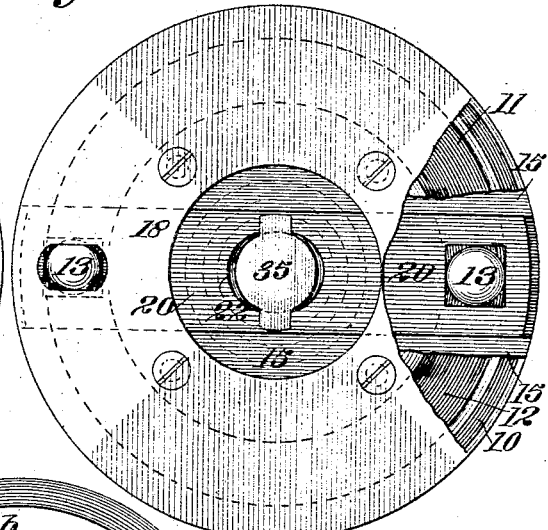
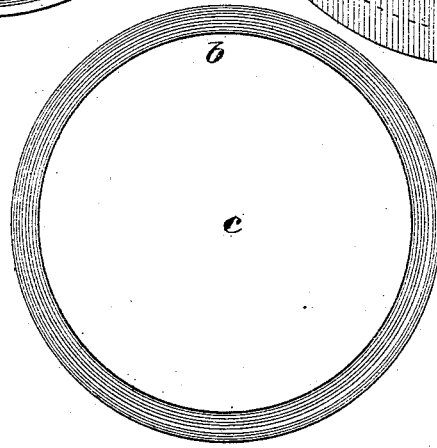
WITNESSES:
Charles Rokles
F. E. Maynard.
INVENTORS.
Hugo W. Stark,
William Knuts
BY G. H. Strong.
ATTORNEY

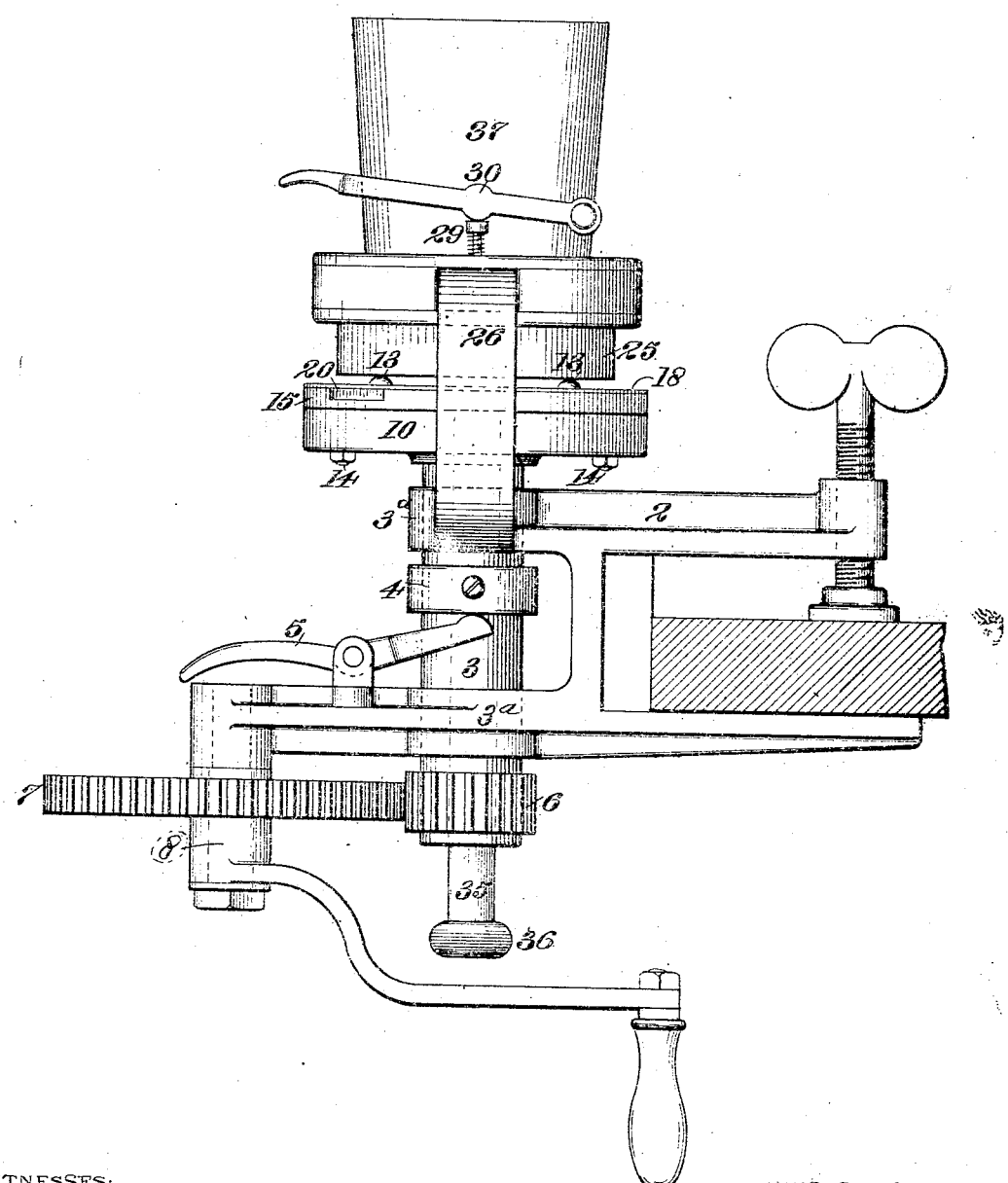

UNITED STATES PATENT OFFICE.

HUGO W. STARK AND WILLIAM KNUTS, OF SAN FRANCISCO, CALIFORNIA.

ROTARY CUTTER.

1,121,776.   Specification of Letters Patent.   Patented Dec. 22, 1914.

Application filed November 1, 1913. Serial No. 798,698.

*To all whom it may concern:*

Be it known that we, HUGO W. STARK, a citizen of the United States, and WILLIAM KNUTS, a subject of the Czar of Russia, residing in the city and county of San Francisco and State of California, have invented new and useful Improvements in Rotary Cutters, of which the following is a specification.

This invention relates to a cutter for cutting blanks or shapes from sheet material particularly paper, rubber, leather, etc., and especially to means for cutting sealing gaskets or washers used in the canning industry, although manifestly its use or application is not restricted.

The chief object of this invention is to provide a simple, practical novel mechanism for expeditiously and accurately cutting rings or gaskets from thin stock.

Other objects and advantages will appear hereinafter.

The invention consists generally in the combination shown of a die or anvil member or members for defining the form of the piece to be produced and revolving balls adapted to be forced with sufficient pressure against a piece of stock interposed between the anvil and the balls so as to cut from the stock the piece desired by the application of pressure; and consists further of means for automatically centering and governing the position of the balls, with relation to the anvil; and also of means for moving one or the other of the cutting members.

The invention also comprises details of construction which will be more fully explained by reference to the accompanying drawings, in which—

Figure 1 is a side elevation of the machine embodying the invention, partly broken away. Fig. 2 is an enlarged central transverse section through the rotary cutter carrier and the fixed anvil. Fig. 3 is a plan view showing the operative face of the anvil or fixed die member. Fig. 4 is a plan view of the defining die. Fig. 5 is a plan view, showing a gasket as produced by the illustrated form of cutting mechanism.

2 is a suitable frame or base here shown as adapted to be clamped to a bench or table.

3 is a shaft journaled in frame 2 for lengthwise movement, and 4 is a shift collar for reciprocating the shaft 3 in its bearings $3^a$; the shift collar being engaged by a shift lever 5 suitably mounted upon frame 2.

The shaft 3 may be driven by suitable means, as for instance, a broad-faced pinion 6 fast thereon engaged by a driving pinion 7 on a counter or crank-shaft 8 journaled in the frame, the face of pinion 6 being broad enough to permit the reciprocation of shaft 3 and the parts carried by it within desired limits and yet maintain the two pinions 6—7 in driving engagement.

Removably secured upon one end of the shaft 3 and clamped thereto by suitable means, as a bushing 9, is a head 10 having an open annular groove 11 on its upper face, in which loosely fits a track ring 12 for the cutter balls 13. The track ring 12 is yieldably supported on the springs 13' and the movement of the track is limited by the screws 14 which screw through the bottom of the head 10 and are surrounded by the springs 13' and screw into the track plate 12. The balls 13, of which there may be one or more, are preferably arranged in pairs diametrically opposed and while they run on track 12 they are supported laterally in a turn-table disk 15, which latter is supported by anti-friction balls or rollers 16 on the head 10. The turn-table disk 15 has elongated radial slots 17 through which the balls 13 project. The balls are held in place in the turn-table disk by the perforated top plate 18, which also has elongated radial slots corresponding to the slots 17 in turn-table disk 15, but the slots in the top plate 18 are of less width than the diameter of the balls and embrace the balls above the plane of a horizontal diameter, so that the balls will be kept in place. The upper end of the bushing 9 is slightly flared where it passes through the turn-table plate 15, so as to keep the latter from falling off, at the same time the fit between the turn-table and shaft is such that the turn-table has a free, running movement on its ball-bearing 16 independent of the speed of rotation of the shaft 3 or head 10.

In order to insure each pair of balls 13 traveling in the same circular path independent of any eccentricity of the head 10 or guide die with which the balls 13 coöperate, as shortly to be explained, each pair of diametrically opposed balls 13 are yoked together by means of a sliding bar 20, which gether by means of a diametral way to the turn-table slides in a diametral way to the turn-table plate 15; the yoke bar 20 having perforations through and in which the balls 13 have a snug but free running fit and the yoke bar 20 having an elongated central slot 22 through which the shaft 3 passes.

The projecting balls 13 form one of two complementary cutting members in this machine. The complementary cutting members represented by the ring die or anvil 25 is stationary and is carried by a bracket 26, suitably supported from the frame 2. This anvil 25 has a peripheral groove 27, coaxial with and of the same radius as the peripheral path of the balls 13. In this groove 27 is an annular ejector 28 carried by the spring-pressed pins 29, which are operated by a lever 30. The bottom square edges 31 formed by the inner and outer walls of the groove or channel 27, coöperate with the balls 13 when the head 9 is reciprocated upwardly to cut out a ring or washer $b$, Fig. 5, of the exact dimensions of the channel 27.

35 is an ejector working through the hollow shaft 3 for the purpose of pushing the waste central disk of the blank stock, represented by the area $c$, Fig. 5, left after the washer 5 has been cut; the plunger 35 being operated by suitable means, as head 36, to push the waste portion $c$ up into a hollow throat or discharge hopper 37.

The head 9 and die member or anvil 25 are removable and parts are interchangeable so as to adapt the one machine to cut blanks of different size.

The operation of the machine is as follows: Assuming that the dies and parts are assembled as above described, ready to cut a blank of desired size, and that the rotary head is in normal depressed position and shaft 3 revolved at suitable speed, a sheet of blank stock, indicated at $a$, Fig. 2, is inserted between the rotary cutter members, indicated by the balls 13; and the stationary anvil 25 and the lever 5 operated to press the stock against the sharp edges 31 of the stationary anvil 25. The turn-table 15 which carries the cutting balls 13 is free to rotate on its bearings 16 and to so adapt the cutting balls 13 to the fixed cutting edges 31 and to the stock operated on, that the stock will not be injured or crumpled, no matter how delicate or thin the stock is; the turn-table 15 having a movement independent of the carrier head 10 which permits the latter to be driven at high speed; the turn-table and balls lagging behind, yet responding as pressure is increased. The balls are prevented from injury by means of the yielding track 12. The balls adjust themselves to any eccentricity or defect in setting up the head 10 and anvil 25 by reason of the yoke bar 20: the main thing being to have the balls 13 always follow around the channel 27 and engage both cutting edges 31 of the same at all times. This automatic centering of the balls is very important. When a washer has been cut out as indicated at $b$, Fig. 5, the lever 5 is released allowing the balls and rotary head to drop, plunger 35 is lifted to push the center disk $c$ up into the discharge throat 37, and lever 30 is depressed to eject the washer $b$ from the channel 27. This washer falling on to the rapidly revolving turn-table is ejected by centrifugal force.

It is manifest that this apparatus is capable of variation in its several mechanical details, to adapt it to cut articles of various shapes and sizes, corresponding in shape and width to the channel 27 of the anvil 25, and regulating the orbit of the balls accordingly.

It has been found to be a matter of importance that the cutting edges 31 of the anvil 25 and the balls 13 be of different hardness. In practice we make the edges 31 of hard steel and the balls 13 of brass, because it is easier to replace the balls than the annular die.

Having thus described our invention, what we claim and desire to secure by Letters Patent is—

1. In a cutting device, the combination of an anvil having a continuous channel, the walls of said channel constituting cutting edges, and a ball running in said channel and coöperating with said cutting edges.

2. A cutting device comprising a fixed anvil with an annular groove having a cutting edge, and a pair of diametrically arranged loose balls adapted to run over said cutting edge.

3. A cutting device comprising a fixed anvil having a continuous cutting edge, a rotary carrier with means for moving it toward and from said anvil, and a loose ball on said carrier coacting with said cutting edge to sever any material placed between them.

4. In a cutting device, the combination of a rotary carrier, a pair of diametrically arranged loose balls on said carrier, a fixed anvil having an annular groove, substantially coaxial with the axis of rotation of the carrier and of a radius substantially equal to the radius of the arc of travel of said balls, and means for moving the balls toward and from said groove.

5. In a cutting device, the combination of a rotary carrier, a pair of diametrically arranged loose balls on said carrier, a fixed anvil having an annular groove, substantially coaxial with the axis of rotation of the carrier and of a radius substantially equal to the radius of the arc of travel of said balls, means for moving the balls toward and from said groove, and means for yoking a pair of balls together to adjust them to the groove.

6. In a cutting device, the combination of a rotary carrier, a pair of diametrically arranged loose balls on said carrier, a fixed anvil having an annular groove substantially coaxial with the axis of rotation of the carrier and of a radius substantially equal to the radius of the arc of travel of said balls, means for moving the balls toward and from said groove, and yieldable tracks for the balls.

7. In a cutting device, the combination of a rotary carrier, a pair of diametrically arranged loose balls on said carrier, a fixed anvil having an annular groove substantially coaxial with the axis of rotation of the carrier and of a radius substantially equal to the radius of the arc of travel of said balls, means for moving the balls toward and from said groove, and a plunger operating in said groove.

8. A gasket cutter consisting of a pair of annular concentric cutting edges and rotary balls with means for bringing the balls and said cutting edges into opposing contact upon the stock interposed between the same.

9. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, and said balls and turn-table turnable independently of the head.

10. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, and a yieldably mounted track on the head for said balls.

11. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, and a spring-pressed ejector in the anvil.

12. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, and means for centering the balls in said groove so that they may run when cutting, in cutting contact with both edges of the groove.

13. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, and means for centering the balls in said groove so that they may run when cutting, in cutting contact with both edges of the groove, said last-named means consisting of a sliding yoke plate, substantially as described.

14. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, and a plunger for ejecting the central disk remaining from the cutting operation.

15. In a cutting device, the combination of an anvil member having a continuous groove with cutting edges, an opposed complementary rotary head, cutting balls on the head, means for carrying the head toward and from the anvil to bring the balls into cutting contact with the cutting edges, a turn-table member on the head and carrying the balls, said balls and turn-table turnable independently of the head, said anvil member being hollow and forming a discharge hopper for the central cut portion of the stock operated on remaining after the cutting operation, and a plunger working through the head to eject said central stock portion through said hopper.

16. A cutting device comprising an anvil member having a groove, the edges of the groove forming cutting edges and a free running ball adapted to be pressed into cutting pressure against said cutting edges, said ball and cutting edges being of different degrees of hardness.

In testimony whereof we have hereunto set our hands in the presence of two subscribing witnesses.

HUGO W. STARK.
WILLIAM KNUTS.

Witnesses:
 John H. Herring,
 W. W. Healey.